M. D. Budd,
Bolt Cutter.
Nº 65,338. Patented June 4, 1867.
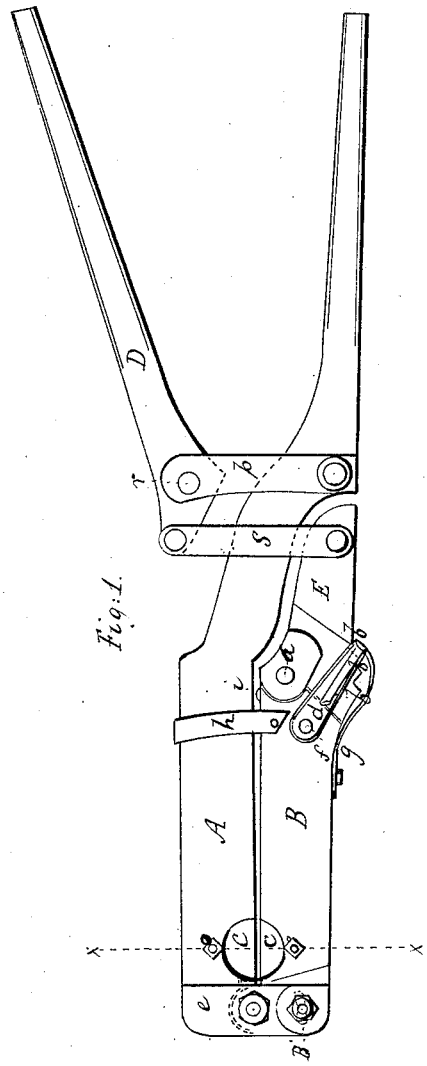
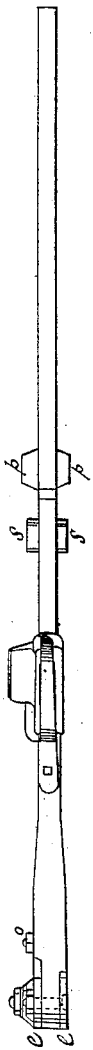
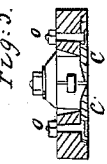
Witnesses:
Theo Tusche
J. A. Service
Inventor:
M. D. Budd
Per Munn & Co
Attorneys

United States Patent Office.

M. D. BUDD, OF ROSCOE, ILLINOIS.

Letters Patent No. 65,338, dated June 4, 1867.

---

IMPROVED BOLT AND RIVET TRIMMER.

---

The Schedule referred to in these Letters Patent and making part of the same.

---

TO ALL WHOM IT MAY CONCERN:

Be it known that I, M. D. BUDD, of Roscoe, in the county of Winnebago, and State of Illinois, have invented a new and improved Bolt and Rivet Trimmer; and I do hereby declare that the following is a full, clear, and exact description thereof, which will enable others skilled in the art to make and use the same, reference being had to the accompanying drawings, forming part of this specification.

My invention consists in constructing a tool for cutting or trimming bolts and rivets in blacksmiths' work, or other iron or metallic work, whereby I obtain a compound lever purchase in cutting the metal, and in the peculiar construction of said machine, as will be hereinafter described.

Figure 1 represents the trimmer complete.

Figure 2 shows an edge view; and

Figure 3 is a cross-section through the line $x$ $x$ of fig. 1.

Similar letters of reference indicate like parts.

This tool operates like a shears, the cutting parts being attached to jaws or levers, as seen in the drawing.

A is one of the levers, to which one of the cutting knives is attached, and B is the other lever jaw. C represents the knives; D is a lever. The jaw B is jointed and so arranged that the jaw can be extended so that the cutter will receive a larger bolt than it otherwise would, and held in position while the power is being applied. It has a slot in the end by which it is pivoted to the ears by the outside bolt B'. This bolt acts as a set-screw. The shorter portion of this jaw E is jointed to the other portion $a$. On its outer edge are notches $b$, as will be noticed. $d$ is a clasp, which is attached to the jaw B at $f$, which is a pivot upon which it turns. It straddles the jaws. This clasp locks on to the notches $b$ as the joint is opened. It is held in position when placed upon any one of the notches by a spring, $g$. $h$ is a guide or support to keep the jaw from sagging at the joint; it is attached to the jaw B, but rests or bears upon the long lever jaw A. Attached firmly to the end of the long jaw or lever A are straps $e$, one on each side. These straps project so as to receive the end of the short jaw between them, where it works on a pivot as its fulcrum. The knives or cutters attached to these jaws are shown in figs. 1 and 3 by C. They are placed in recesses made in the jaws, and are held in their places by screw-bolts, the nuts of which are seen at $o$ in all the figures. These cutters have slot holes through them which allow them to be moved forward or back in their recesses. They are placed so that their faces and cutting edges are flush with the bottom side of the jaws, as seen in fig. 3. The body of the jaws is cut away above the cutting edges so as to admit a bolt, as seen in figs. 1 and 3, between the nuts $o$. The short jaw has a tongue attached to it on one side of the recess for the bolt, and the other jaw is rebated to receive it. This acts as a guide to keep the cutting edges level with each other and to prevent the bolt from going below the knives. The lever D is attached to the long lever jaw A by straps $p$, one of which is rigidly attached to each side of A, between which the lever D works. Its fulcrum is a pin, $v$, through the straps. It is connected with the short end of the jointed jaw B (or with E) by straps S, one upon each side, as seen in the drawing. The long lever jaw A passes between these straps.

It will thus be seen that a very great power can be applied to the knives, it being a compound lever purchase. On the jaw B there is a small projection, $i$, which is for the purpose of preventing the knives from coming together or being injured by contact with each other.

Having thus described my invention, what I claim as new, and desire to secure by Letters Patent, is—

The combination of the spring $g$, the clasp $d$, and the guide $h$, arranged substantially as described.

M. D. BUDD.

Witnesses:
C. VINCENT,
L. B. BRADLEY.